United States Patent [19]

Sandberg

[11] 4,372,008
[45] Feb. 8, 1983

[54] FOOD PATTY MOLDING MACHINE WITH MULTI-ORIFICE FILL PASSAGE AND STRIPPER PLATE

[75] Inventor: Glenn A. Sandberg, Lockport, Ill.

[73] Assignee: Formax, Inc., Mokena, Ill.

[21] Appl. No.: 256,797

[22] Filed: Apr. 23, 1981

Related U.S. Application Data

[63] Continuation-in-part of Ser. No. 204,840, Nov. 7, 1980.

[51] Int. Cl.³ .............................................. A22C 7/00
[52] U.S. Cl. ........................................................ 17/32
[58] Field of Search ................. 17/32; 426/512, 513, 426/516; 425/310, 311, 298, 297

[56] References Cited

U.S. PATENT DOCUMENTS

| | | | |
|---|---|---|---|
| 3,887,964 | 6/1975 | Richards | 17/32 |
| 4,054,967 | 10/1977 | Sandberg et al. | 17/32 |
| 4,182,003 | 1/1980 | Lamartino et al. | 17/32 |
| 4,272,864 | 6/1981 | Holly | 17/45 |

Primary Examiner—Willie G. Abercrombie

Attorney, Agent, or Firm—Kinzer, Plyer, Dorn & McEachran

[57] ABSTRACT

A food patty molding machine of the kind in which a food pump pumps a moldable food product through a fill passage into the mold cavities of a cyclically operable mold plate, with a multi-orifice plate interposed in the outlet end of the fill passage to distribute the food product throughout substantially the entire surface area of each mold cavity during filling. The fill orifices are aligned in parallel rows with equal center-to-center spacing between orifices; a stripper plate is slidably mounted immediately adjacent the orifice plate and has a multiplicity of fill openings aligned one- for-one with the fill orifices as extensions of those orifices. A stripper plate drive, synchronized with the mold plate drive, slides the stripper plate through a distance equal to the center-to-center spacing of the orifices once in each mold plate cycle to sever and re-position food fibers caught on the upstream side of the stripper plate so that those fibers are fed into the mold cavity in the next machine cycle.

5 Claims, 11 Drawing Figures

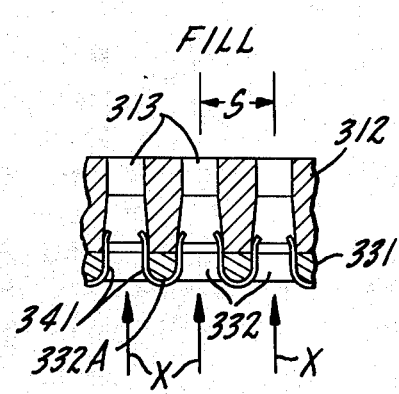
Fig.6A. FILL
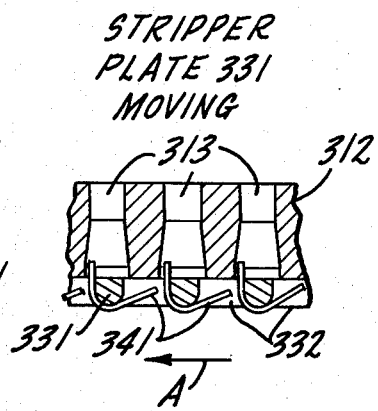
Fig.6B. STRIPPER PLATE 331 MOVING
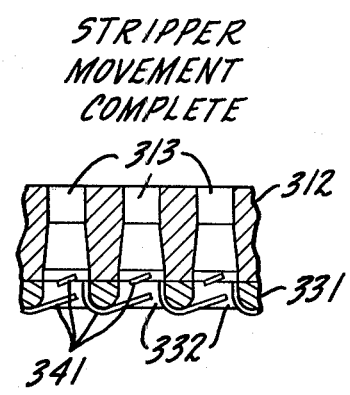
Fig.6C. STRIPPER MOVEMENT COMPLETE
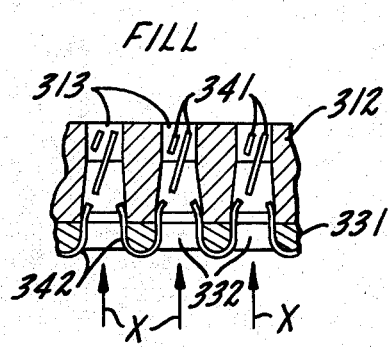
Fig.6D. FILL
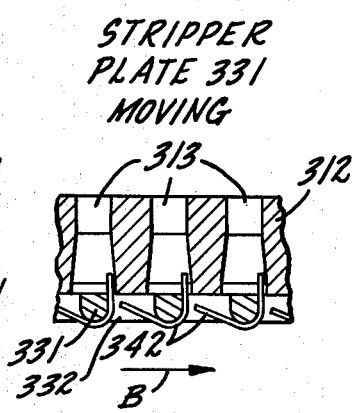
Fig.6E. STRIPPER PLATE 331 MOVING
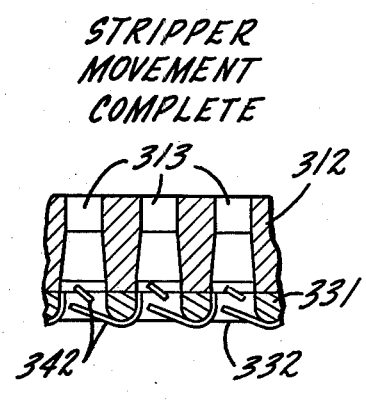
Fig.6F. STRIPPER MOVEMENT COMPLETE 4,372,008

FOOD PATTY MOLDING MACHINE WITH MULTI-ORIFICE FILL PASSAGE AND STRIPPER PLATE

CROSS REFERENCE TO RELATED APPLICATION

This application is a continuation-in-part of Sandberg et al U.S. patent application Ser. No. 204,840 filed Nov. 7, 1980 for "Method and Apparatus for Molding Food Patties".

BACKGROUND OF THE INVENTION

Food patties of various kinds, including hamburgers, molded "steaks", fish cakes, chicken patties, pork patties, potato patties, and others, are frequently formed in high-volume automated molding machines. Patty molding machines that can be adapted to any of these food products and that have proven quite successful are described in U.S. Pat. No. 3,887,964 to L. R. Richards, No. 4,054,967 to G. A. Sandberg et al, and No. 4,182,003 to LaMartino et al.

Although any of these machines, and others as well, are capable of producing food patties of consistent size, weight, and configuration on a high volume basis, substantial problems and difficulties still remain in some instances. Thus, in most patty molding machines it is quite difficult to duplicate the texture of hamburgers and other patties that are hand-molded. The machine-molded food patties frequently exhibit a tendency toward excess shrinkage when the patties are subsequently cooked. Another continuing problem pertains to distortion in the shape of the food patties, again occurring primarily when the patties are cooked.

The aforementioned Sandberg et al U.S. patent application Ser. No. 204,840 discloses a method and apparatus for molding food patties that produces patties of essentially uniform texture having minimal shrinkage when the patties are cooked. Furthermore, the patties hold their shape consistently following cooking. In that patty molding machine, in one embodiment, a multi-orifice plate is interposed in the outlet end of a fill passage extending from a food pump to a cyclically moving mold plate. To minimize buildup of food product on the orifice plate, the edges of the orifices facing the food pump are rounded. Furthermore, the operation of the food pump is modified, as compared with prior art practice, so that the maximum fill pressure, required for adequate filling of the mold cavities, is used for only a limited part of each mold plate cycle; the pressure is reduced to an intermediate pressure during a minor fraction of the mold plate cycle immediately following filling of the mold cavities, and then maintained at the intermediate level or reduced even further during the balance of the mold plate cycle, a period of at least about half of the total cycle.

That arrangement, though highly satisfactory for many food products (e.g., ground pork, ground chicken, finely ground beef, etc.) is not entirely successful for other foods, particularly those that may incorporate relatively long and sometimes tough fibrous components. An example of such a food product is ground beef, particularly if the beef is coarsely ground. A food product of this nature still tends to create a buildup of fibrous material at the entrances of the orifices, requiring an excessive increase in the food product pressure in order to maintain operation of the patty molding machine at the desired speed.

SUMMARY OF THE INVENTION

It is a principal object of the present invention, therefore, to provide a new and improved food patty molding machine that effectively eliminates or minimizes the problems and difficulties described above and that permits the molding of food products that may contain relatively long and tough fibers without requiring a reduction in the speed of operation or an increase in food product pressure.

A specific object of the invention is to provide a new and improved mechanism for severing and re-positioning long food fibers that may accumulate on the upstream side of an orifice plate in the fill passage of a food patty molding machine, so that those fibers are effectively fed into the mold cavities of the machine in a subsequent molding cycle.

Accordingly, the invention relates to a food patty molding machine of the kind comprising a mold plate having at least one mold cavity of given surface area formed therein, mold plate drive means for driving the mold plate, in a repeating cycle, from a fill position to a discharge position and back to the fill position, a food pump for pumping a moldable food product, a fill passage extending from the outlet of the food pump to the mold plate and connecting the food pump outlet to the mold cavity when the mold plate is in its fill position, the fill passage having a cross-sectional area, immediately adjacent to the mold plate fill position, effectively encompassing substantially the entire surface area of the mold cavity, and an orifice plate, interposed in the fill passage immediately adjacent the mold plate, including a multiplicity of fill orifices distributed throughout substantially the entire surface area of the mold cavity. The improvement of the invention comprises aligning the fill orifices in parallel rows with equal center-to-center spacing between the orifices in the direction of the rows; a stripper plate is slidably mounted in the fill passage immediately adjacent the side of the orifice plate opposite the mold plate, the stripper plate including a multiplicity of fill openings aligned one-for-one with the fill orifices as extensions thereof. Stripper plate drive means, synchronized with the mold plate drive means, are provided for sliding the stripper plate through a distance approximately equal to the center-to-center spacing of the orifices once in each mold plate cycle.

BRIEF DESCRIPTION OF THE DRAWINGS

FIGS. 6A-6F are sequential detail views used to explain operation of the stripper plate.

DESCRIPTION OF THE PREFERRED EMBODIMENT

Figure 1:
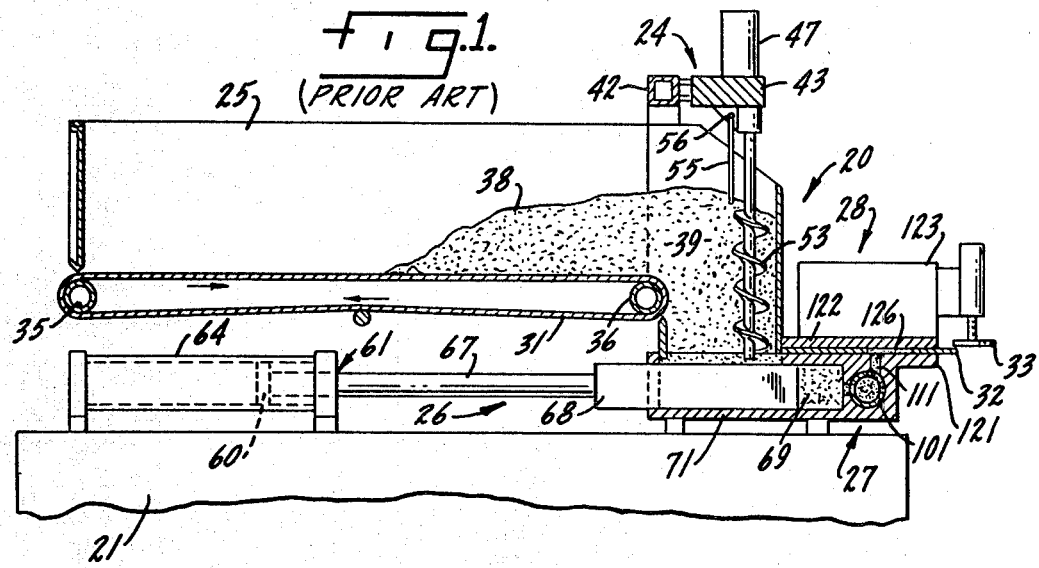
FIG. 1 is a sectional elevation view of a food patty molding machine of one type to which the present invention can be applied, specifically the molding machine of Richards U.S. Pat. No. 3,887,964.
Figure 2:
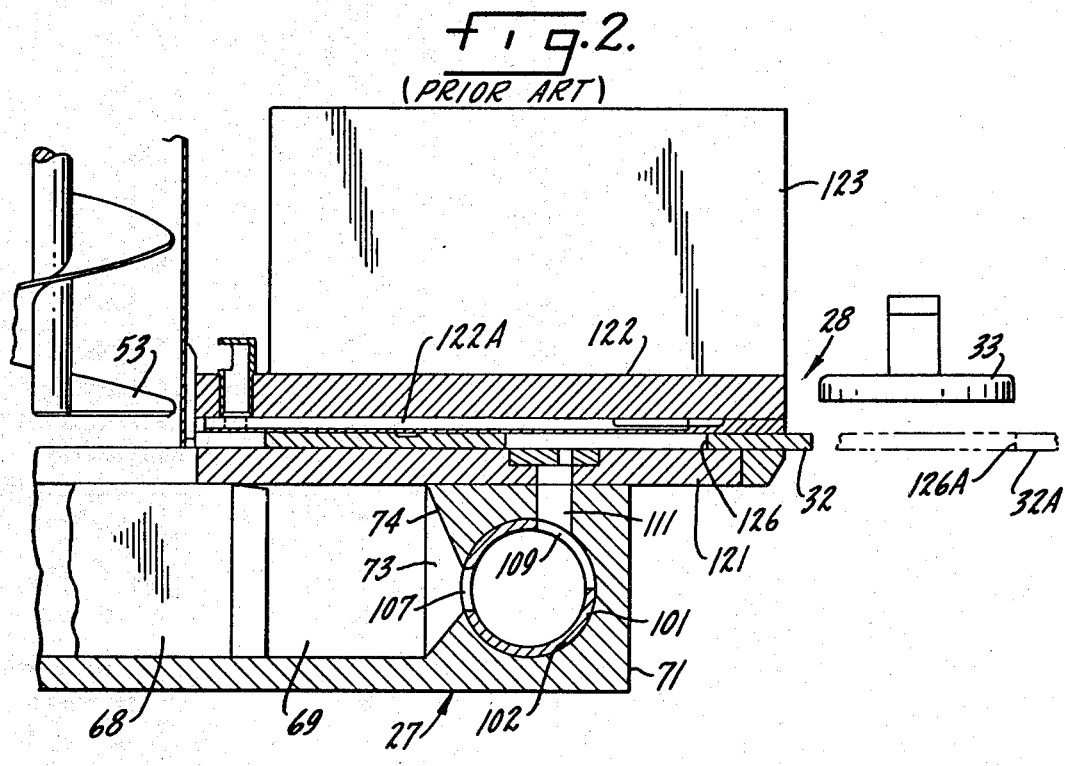
FIG. 2 is an enlarged sectional view of the molding mechanism previously used in the machine shown in FIG. 1.

FIGS. 1 and 2 illustrate a high volume food patty molding machine 20 of the type described in much greater detail in Richards U.S. Pat. No. 3,887,964, which machine has been marketed for several years as the Formax 26 machine by Formax, Inc. of Mokena, Ill. Molding machine 20 includes a machine base 21 which supports the operating mechanisms of the machine and contains hydraulic actuating systems, electrical actuating systems, and most of the machine controls.

The food patty molding machine 20 includes a supply means 24 for supplying a moldable food product, such as ground beef, fish, pork, chicken, potatoes, or the like, to the processing mechanisms of the machine. Supply means 24 includes a large food product storage hopper 25 that opens into the intake of a food pump system 26. In this particular machine, the food pump system 26 includes two food pumps operating in alternation; other machines typically include only a single food pump.

The two food pumps of system 26 continuously pump food, under pressure, into a valve manifold 27 connected to a cyclically operable molding mechanism 28. Molding mechanism 28 includes a multi-cavity mold plate 32 that moves cyclically between a fill position, shown in FIGS. 1 and 2, and a discharge position in which the mold plate is aligned with a series of knock-out cups 33.

In addition to hopper 25, the food supply means 24 includes a conveyor belt 31 that extends completely across the bottom of the hopper, around a tensioning roller 35 and a drive roller 36. In FIG. 1, a limited supply of food product 38 is shown in hopper 25; a much greater supply could be stored in the hopper without exceeding its capacity.

The forward end of hopper 25 communicates with a vertical pump feed opening 39 that leads downwardly into two pump chambers; only one pump chamber 69 is shown. A frame 42 mounted on machine base 21 extends over the top of hopper 25, above the hopper outlet 39, and a bracket 43 affixed to frame 42 supports three motors for driving three downwardly vertically extending feed screws. Only one motor 47 and feed screw 53 are shown in the drawings.

A level sensing mechanism at the outlet end of hopper 25 comprises a sensing element 55 affixed to a shaft 56 that extends downwardly into the forward end of hopper 25. As food product moves forwardly in the hopper, it may accumulate to a level at which it engages sensor 55. When this occurs, shaft 56 is rotated and actuates a limit switch (not shown) to interrupt the drive for the conveyor drive roller 36. This makes it possible to maintain the accumulation of food product at a safe level at the outlet end 39 of food hopper 25.

In machine 20, FIGS. 1 and 2, as noted above, the food pump system 26 comprises two reciprocating food pumps; only one pump 61 is illustrated. Food pump 61 includes a hydraulic cylinder 64 having two ports 65 and 66. The piston 60 in cylinder 64 is connected to a piston rod 67 in turn connected to a large pump plunger 68. Plunger 68 is aligned with and extends into the pump cavity 69, which is formed by a pump cavity enclosure or housing 71. The forward wall 74 of pump cavity 69 includes a slot 73 that communicates with the pump manifold 27.

The pump feed manifold 27 includes a manifold valve cylinder 101 fitted into an opening 102 in housing 71 immediately beyond the pump cavity wall 74. Valve cylinder 101 includes two intake slots; only one of these intake slots 107 is illustrated. As shown in FIGS. 1 and 2, slot 107 is alignable with the outlet slot 73 in pump cavity wall 74, and this is the position employed when pump 61 is in use. Rotation of cylinder 101 is effective to move slot 107 out of alignment with slot 73 when the other pump of machine 20 is in operation. Valve cylinder 101 also includes an elongated outlet slot 109 aligned with a slot 111 in housing 71 that comprises a fill passage for the molding mechanism 28.

The upper part of the housing 71 for pump cavity 69 comprises a plate 121 that supports mold plate 32. Mold plate 32 includes a plurality of individual mold cavities 126 extending across the width of the mold plate; mold cavities 126 are alignable with the manifold outlet, fill passage 111, as shown in FIGS. 1 and 2. A breather plate 122A is disposed immediately above mold plate 32, and is itself covered by a mold cover 122, thus closing off the top of each of the mold cavities 126. A housing 123 is positioned above cover plate 122. Suitable spacers (not shown) are provided between breather plate 122A and support plate 121 to maintain the spacing between those two plates essentially equal to the thickness of mold plate 32. Housing 123 encloses the operating mechanism (not shown) for knock-out cups 33.

In the operation of patty molding machine 20, a supply of ground meat or other moldable food product 38 is dumped into hopper 25 from overhead. The food product 38 is advanced toward hopper outlet 39 by conveyor 31. Whenever one of the plungers of the food pumps, such as the plunger 68 of food pump 61, is retracted to expose a pump cavity (e.g., cavity 69), the vertical feed screws such as feed screw 53 that are aligned with that pump cavity are actuated to feed the food product into the pump cavity.

In FIGS. 1 and 2, pumping system 26 is illustrated with mold plate 32 in its fill position and with pump 61 pumping the moldable food product into manifold 27. The second food pump of the machine, at this time, may be receiving a supply of the food product for a subsequent pumping operation. Pump 61, as shown, has just begun its pumping stroke, and has compressed the food product in pump cavity 69, forcing the food product through slot 73 and into manifold 27. As operation of machine 20 continues, plunger 68 advances as food product flows into the mold cavities through manifold 27, maintaining a relatively constant fill pressure on the remaining food product in chamber 69, manifold 27, and fill passage 111.

Ultimately, when the food product in pump cavity 69 is nearly exhausted, valve cylinder 101 is rotated to connect its intake to the outlet of the second food pump and to shut off its intake slot 107 from the outlet 73 of pump chamber 69. Thereafter, the second food pump is maintained in operation. The plunger 68 of food pump 61 is then retracted, by means of cylinder 64 and piston 60, to allow for refilling of pump cavity 69 with food product 38. Subsequently, when the second food pump requires refilling, a corresponding changeover occurs. In this manner, overlapping alternating operation of the two food pumps continues as long as molding machine 20 is in operation. Each time a pump changeover occurs, it is preceded by a rotation of valve cylinder 101 of manifold 27 to bring the new pump into operation before the refill cycle for the pump that has been in use is initiated.

In describing the operation of molding mechanism 28, and particularly mold plate 32, it is convenient to start with mold plate 32 in the fill position as shown in FIGS. 1 and 2. In each molding cycle, mold plate 32 remains in this fill position for a limited time interval. As the mold cavities 126 move into the fill position, one of the two food pumps of machine 20 pumps food product through manifold 27 and fill passage 111, filling the mold cavities. To assure complete filling of the mold cavities, the food pump must apply a substantial pressure to the food product. In the machine of FIGS. 1 and 2 the fill pressure on the food product may be of the order of one hundred pounds per square inch, subject to variation in accordance with the requirements of the food product being molded into patties, the sizes of the mold plate cavities 126, and other related factors. In other machines, different fill pressures may be required.

Following the fill dwell interval, mold plate 32 is moved outwardly from the fill position shown in FIGS. 1 and 2 until it reaches a discharge position generally indicated by the phantom outline 32A in FIG. 2. With mold plate 32 in discharge position 32A, each of the mold cavities 126 is in a position 126A aligned with one of the knockout cups 33. A second dwell interval occurs at this point, during which the knockout cups 33 move downwardly through the mold cavities, discharging the molded food patties onto a takeoff conveyor (not shown).

Following discharge of the molded food patties, mold plate 32 is moved back toward the fill position so that mold cavities 126 can again be filled with food product. In this manner, food patties are molded at a rapid pace by machine 20; the commercial version of machine 20 normally operates at a rate of ninety molding cycles per minute. Inasmuch as there may be as many as six or more mold cavities in mold plate 32, it is seen that the output rate for machine 20 may be in excess of five hundred food patties per minute.

Figure 3:
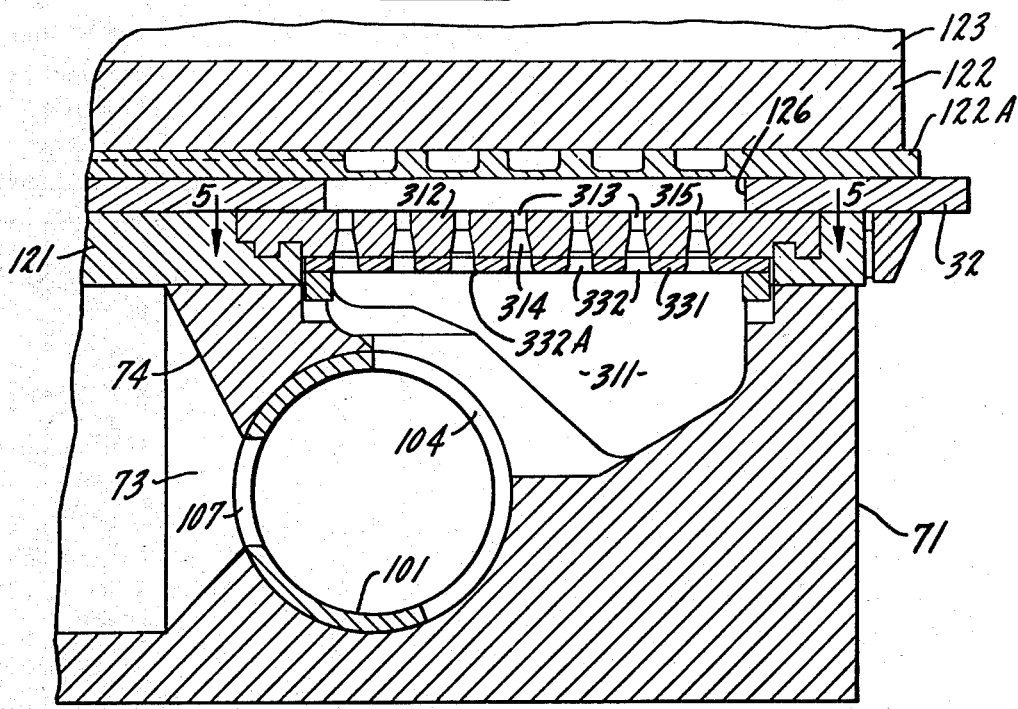
FIG. 3 is a sectional view, like FIG. 2, illustrating a modification of the machine of FIGS. 1 and 2 in accordance with a preferred embodiment of the present invention.
Figure 5:
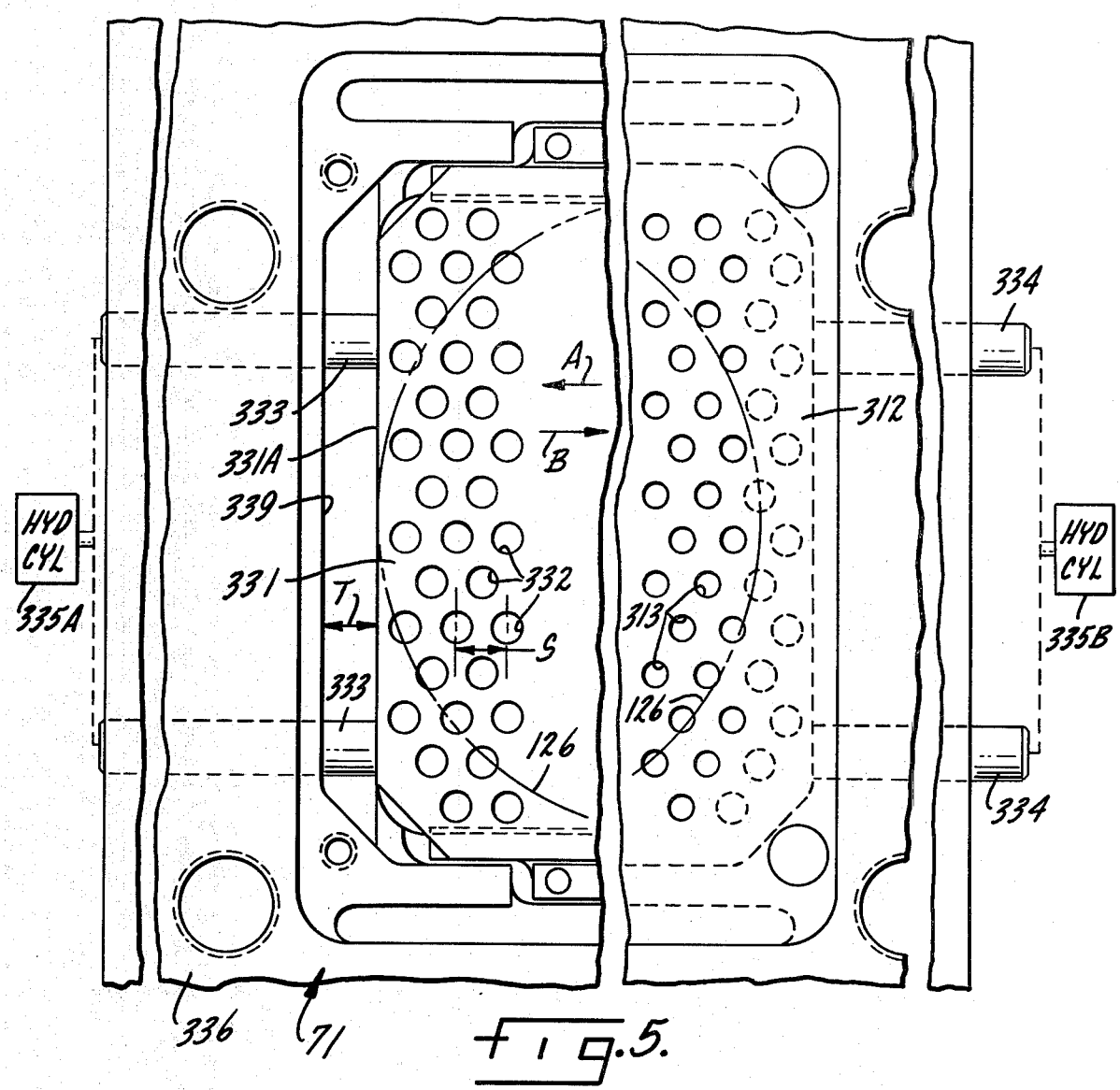
FIG. 5 is a plan view of the fill passage of the preferred embodiment, taken approximately along line 5—5 in FIG. 3 but broken away to show a part of a stripper plate interposed in the fill passage.

FIGS. 3 and 5 illustrate a modification of the patty molding machine 20 comprising one embodiment of the present invention. One principal change is in the size of the fill passage 311 of the molding mechanism, as compared with the fill passage 111 in the conventional construction. Thus, as clearly shown in FIG. 3, the fill passage 311 is greatly enlarged, immediately adjacent to the mold plate 32, to the extent that the fill passage encompasses substantially the entire surface area of all of the mold cavities 126. This relationship is also generally shown in FIG. 5, which affords a plan view of an insert or orifice plate 312 that is interposed in the outlet end of fill passage 311 immediately adjacent mold plate 32. In FIG. 5, the surface areas of the mold cavities 126 are shown in phantom outline to illustrate the effective coverage of the mold cavity surface areas by the fill passage.

A multiplicity of closely spaced fill orifices 313 are distributed, preferably in staggered rows, throughout substantially the entire surface area of plate 312. Consequently, these orifices 313 are distributed throughout the entire surface area of each of the mold cavities 126; see FIG. 5. The inlet portion 314 of each orifice 313 is larger in diameter than the outlet portion 315. By way of example, the orifice outlet diameter may be 0.25 inch, with an inlet diameter of 0.31 inch. The inlet portions 314 of the orifices 313 converge to the outlet portions 315. In a typical construction, the angle of convergence may be of the order of twenty degrees, but substantial variation is acceptable. The orifices 313 may be tapered, as shown; another acceptable construction is to utilize a straight outlet portion 315 merging into an inlet portion 314 formed as a blend of radii.

A stripper plate 331 is slidably mounted in fill passage 311 immediately adjacent the side of the orifice plate 312 opposite mold plate 32, as shown in FIGS. 3 and 5. In fact, stripper plate 331 is disposed in surface-to-surface contact with orifice plate 312. Stripper plate 331 includes a multiplicity of fill openings 332 that are distributed throughout substantially its entire surface area and aligned one-for-one with fill orifices 313 so that each fill opening 332 is an extension of one of the fill orifices 313. Both the fill orifices 313 and the fill openings 332 are aligned in parallel rows with equal center-to-center spaces S between the orifices (and fill openings) in the direction of the orifice rows (see FIG. 5). The edges 332A of fill openings 332 that face toward the food pump are rounded to minimize food product buildup; see FIG. 3. Each row of fill openings 332 includes one more opening than the corresponding row of orifices 313, as indicated by openings 332B (FIG. 5).

Each end of stripper plate 331 has two push rods mounted thereon, the rods 333 at the left-hand side of the stripper plate and the rods 334 at the right-hand side of that plate as seen in FIG. 5. Ths stripper plate rods 333 extend through the side wall 336 of housing 71 and are connected to a drive mechanism, preferably a hydraulic cylinder as indicated schematically at 335A. A similar construction is provided at the opposite end of stripper plate 331, together with another operating cylinder 335B. This affords a stripper plate drive means for sliding the stripper plate 331 back and forth in the direction indicated by the arrows A and B, FIG. 5. In FIG. 5, stripper plate 331 is shown at the right-hand limit of its travel; at the opposite extreme, the left-hand edge 331A of the stripper plate engages a surface 339 that is a part of housing 71. The total travel of stripper plate 331 is a distance T, equal to the center-to-center orifice spacing S.

The construction illustrated in FIGS. 3 and 5 has been found to be highly advantageous in the formation of hamburger patties and other molded food patties in several respects. With this multiple-orifice full area fill passage arrangement, the food product leaving the outlets 315 of the orifices 313 expands within each mold cavity 126, filling the mold cavity completely. However, the food product flows only a short distance in the mold cavity, much less than in the conventional arrangement of FIG. 2, and expands from a series of locations immediately adjacent the orifice outlets instead of from one location. The result, particularly when pressure conditions are controlled in the manner described hereinafter, is an improvement in the texture of the molded food patties; the texture is more like that of a hand-molded food patty than is realized with the conventional construction described above in connection with FIG. 2. Furthermore, the food patties tend to shrink less and hold their shape more consistently when cooked.

In the conventional patty molding machine of FIGS. 1 and 2, the pressure on the food product in pump cavity 69, manifold 27, and fill passage 111 is normally held at a high level, the level required for filling the mold cavities, during much of the molding cycle. Thus, each food pump serves to supply food product under pressure to the molding mechanism through a sequence of several mold plate cycles, without pressure relief. Furthermore, the second pump is brought into operation and maintains fill pressure continuously during pump changeover and during the next sequence of mold plate cycles.

The pattern of pressure application to the food product in the pump chamber and in the fill passage is somewhat different for other types of machines, particularly those in which there is a pump intake cycle during each cycle of operation of the mold plate, such as in LaMartino et al U.S. Pat. No. 4,182,003. In those machines, there is a reduction of pressure during a part of each mold plate cycle, while the pump chamber is being filled. Indeed, in such machines a limited vacuum may be produced in the pump chamber to aid in filling that chamber. Nevertheless, in any of these machines conventional practice has entailed the maintenance of high pressure on the food product in the fill passage for at least about half of the mold plate cycle, including the entire time that the mold cavity is moving into and away from the fill position but remains in communication with the fill passage. In general, it has been thought that this way necessary to assure effective operation of the molding machines.

As described in the aforementioned Sandberg et al application, the quality of the molded food patties can be improved by relieving the pressure on the food product in the pump cavity and in the fill passage throughout a substantial portion of the molding cycle. Specifically, and particularly in a molding machine in which a portion of the mold cavity may be exposed to the atmosphere while another portion remains in communication with a part of the fill passage, which is true of the mechanism shown in FIG. 3, the quality of the molded food patties is materially improved if the pressure is relieved substantially (but not entirely) during the time interval in which the mold plate is moving away from its fill position but a part of the mold cavity remains in communication with the fill passage.

Figure 4:
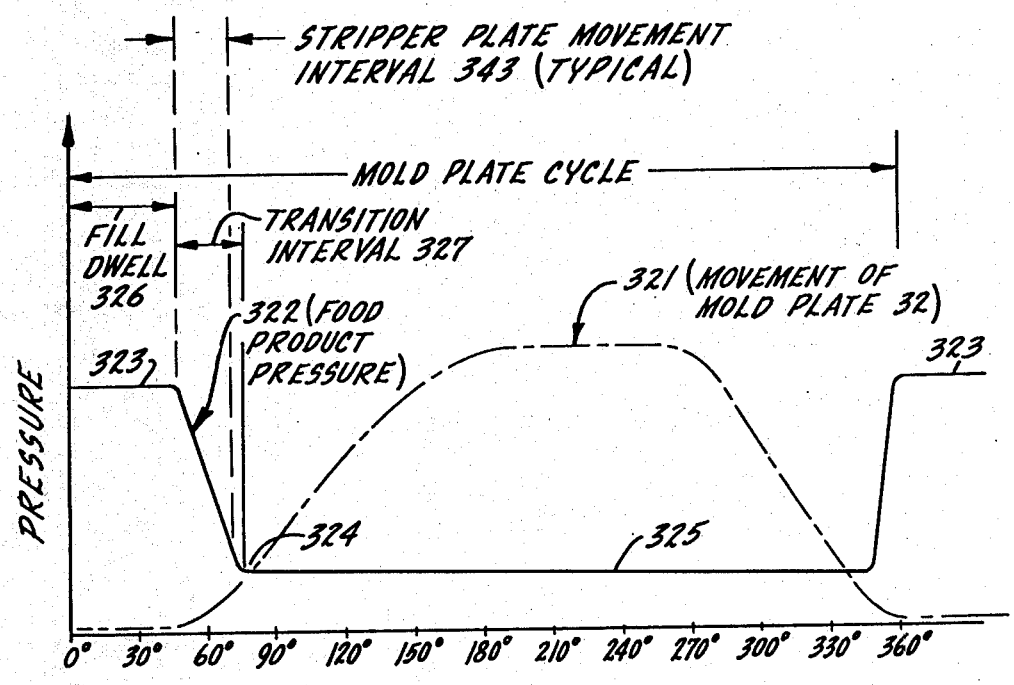
FIG. 4 is a chart showing a preferred pressure cycle used in conjunction with the present invention.

The preferred pressure relationship is illustrated in FIG. 4 as a function of the mold plate cycle timing. In FIG. 4, the phantom line curve 321 shows the cyclic movement of mold plate 32. The solid line curve 322 illustrates the pressure that is applied to the food product in the fill passage of the machine.

As indicated in FIG. 4, a given maximum fill pressure 323 is applied to the food product in the fill passage during the fill dwell interval 326 to assure complete filling of the mold cavities. Immediately following the fill dwell interval 326, however, in a succeeding transition interval 327 in which mold plate 32 is moving away from its fill position but a part of each mold cavity remains in communication with the fill passage, the pressure on the food product is reduced to an intermediate pressure 324 that is a minor fraction of the fill pressure 323. Typically, the intermediate pressure 324 may be approximately twenty percent of the fill pressure 323, though this value may vary to some extent depending upon the nature of the food product and the size and configuration of the mold cavities. The intermediate pressure 324 should be sufficient to preclude backflow of food product from the mold cavity into the fill passage during the transition interval 327. This requirement can be met by maintaining the intermediate pressure 324 in a range of about ten percent to fifty percent of the fill pressure 323 in most instances. In the Formax 26 machine, using a fill pressure 323 of 110-150 psi, the intermediate pressure 324 is preferably in a range of about ten to seventy-five pounds per square inch; in other machines, of course, other values are likely to be required.

As also indicated in FIG. 4, in the preferred pressure relationship the pressure on the food product is retained at or below the intermediate pressure 324 during the remainder of the cycle. That is, during the extended interval 325 the actual pressure on the food product remains at or drops below the intermediate pressure 324. The pressure relief interval 325 is preferably maintained through a major portion of the mold plate cycle. In any event, this condition should be maintained for at least about half of the mold plate cycle. A complete disclosure of a preferred hydraulic pump drive for achieving the pressure relationships of FIG. 4 is provided in the aforementioned Sandberg et al application, which is incorporated herein by reference.

The operation of stripper plate 331 can best be understood by reference to the sequence of views presented in FIGS. 6A–6F. FIG. 6A shows the alignment of the stripper plate with orifice plate 312 during a fill dwell interval 326 (FIG. 4). This position is maintained throughout the fill dwell interval, with food product being pumped under pressure through the fill openings 332 and orifices 313 (arrows X) and into the mold cavities. During this interval any relatively long fibers present in the food product may catch on the edges 332A of the stripper plate fill openings 332, as indicated schematically by the fibers 341.

After the end of the fill dwell, with the mold cavities filled and the mold plate beginning its movement toward its discharge position, stripper plate 331 is shifted through the distance T (FIG. 5) to its alternate position. FIG. 6B shows the stripper plate at an intermediate point in its sliding movement; the direction of movement is in the direction of the arrow A, FIGS. 5 and 6B. When that movement is completed, stripper plate 331 is again positioned with its fill openings 332 aligned one-for-one with the orifices 313 as shown in FIG. 6C. The movement of the stripper plate, however, has severed each of the fibers 341 and has repositioned the fibers so that a substantial portion of each fiber extends across one of the fill openings 332 and short segments of the fibers are aligned with the fill openings.

When movement of the ground meat or other food product commences in the fill dwell interval of the next mold plate cycle, the re-positioned segments of the fibers 341 pass through the fill openings 332 and orifices 313 into the mold cavities as indicated in FIG. 6D. During this fill dwell, additional fibers 342 may accumulate on the edges of the fill openings in stripper plate 331. Those fibers 342 are re-positioned, and severed if long enough, when the stripper plate slides back to its original position, in the direction of arrow B (FIGS. 5 and 6E) later in the mold plate cycle. Thus, when the return movement of stripper plate 331 is completed, the fibers are again aligned with the orifices (FIG. 6F) and will be impelled into the mold cavities in the next fill dwell interval. Some amount of remaining fill pressure forcing product against the underside of the stripper plate is desirable during the sliding motion to prevent food product from working its way between thes tripper and orifice plates. A preferred timing for the movement of stripper plate 331 is indicated by interval 343 in FIG. 4; stripper plate movement interval 343 is subject to substantial variation, so long as there is no appreciable overlap with the fill dwell interval 326.

Thus, in each mold plate cycle stripper plate 331 slides through the distance T, equal to the center-to-center spacing S of the fill orifices (FIG. 5) to reposition and sever any fibers accumulating on the edges of the fill openings 332. Buildup of the food product at the inlet ends of the orifices is effectively precluded, despite the presence of substantial fiber content; the patty molding operation can be maintained at full speed with minimum fill pressure on the food product while gaining the benefits of multi-orifice feed for the mold cavities as described above.

I claim:

1. In a food patty molding machine of the kind comprising:
   a mold plate having at least one mold cavity of given surface area formed therein;
   mold plate drive means for driving the mold plate, in a repeating cycle, from a fill position to a discharge position and back to the fill position;
   a food pump for pumping a moldable food product;
   a fill passage extending from the outlet of the food pump to the mold plate and connecting the food pump outlet to the mold cavity when the mold plate is in its fill position, the fill passage having a cross-sectional area, immediately adjacent to the mold plate fill position, effectively encompassing substantially the entire surface area of the mold cavity;
   and an orifice plate, interposed in the fill passage immediately adjacent the mold plate, including a multiplicity of fill orifices distributed throughout substantially the entire surface area of the mold cavity;
   the improvement comprising:
   the fill orifices being aligned in parallel rows with equal center-to-center spacing between the orifices in the direction of the rows;
   a stripper plate slidably mounted in the fill passage immediately adjacent the side of the orifice plate opposite the mold plate, the stripper plate including a multiplicity of fill openings aligned one-for-one with the fill orifices as extensions thereof;
   and stripper plate drive means, synchronized with the mold plate drive means, for sliding the stripper plate through a distance approximately equal to the center-to-center spacing of the orifices once in each mold plate cycle.

2. A food patty molding machine according to claim 1 in which the size and configuration of the inlet of each fill orifice, facing the stripper plate, matches the size and configuration of the fill openings alignable with that fill orifice.

3. A food patty molding machine according to claim 2 in which the edges of the fill openings on the side of the stripper plate facing toward the food pump are rounded to limit food product buildup at those edges.

4. A food patty molding machine according to claim 3 in which each fill orifice is of convergent configuration, having an outlet smaller than its inlet.

5. A food patty molding machine according to claim 1, claim 2, claim 3, or claim 4, in which the mold plate drive means provides a fill dwell at the mold plate fill position and in which the food pump is a variable pressure pump, and further comprising:
   pump drive means, synchronized with the mold plate drive means, for actuating the food pump to apply pressure to the food product in the fill passage as follows:
   A. a given maximum fill pressure, sufficient to fill the entire mold cavity, during a portion of the mold plate cycle including the fill dwell interval;
   B. an intermediate pressure, no more than a minor fraction of the fill pressure, during a major portion of the transition interval in each mold plate cycle in which the mold plate moves away from the fill position but a part of the mold cavity remains in communication with the fill passage;
   C. and a pressure equal to or less than the intermediate pressure during the balance of the mold plate cycle, comprising at least about half of that cycle.

* * * * *